US007779426B2

(12) United States Patent
Rogers et al.

(10) Patent No.: US 7,779,426 B2
(45) Date of Patent: Aug. 17, 2010

(54) DESCRIBING AND QUERYING DISCRETE REGIONS OF FLASH STORAGE

(75) Inventors: Andrew Michael Rogers, Seattle, WA (US); Sachin Chiman Patel, Bellevue, WA (US); Yadhu N. Gopalan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 11/393,349

(22) Filed: Mar. 30, 2006

(65) Prior Publication Data

US 2007/0239927 A1   Oct. 11, 2007

(51) Int. Cl.
*G06F 3/00* (2006.01)
*G06F 9/44* (2006.01)
*G06F 13/00* (2006.01)

(52) U.S. Cl. .................... 719/321; 719/313; 710/1; 710/8; 710/9; 710/15; 710/16; 711/100; 711/101; 711/102; 711/103; 711/170; 711/173

(58) Field of Classification Search ................. 719/313, 719/321; 710/1, 8–19, 15–16, 62; 711/100–103, 711/170, 173
See application file for complete search history.

(56) References Cited

U.S. PATENT DOCUMENTS

| 6,598,169 | B1 | | 7/2003 | Warwick et al. | ............ 713/320 |
|---|---|---|---|---|---|
| 6,621,746 | B1 | * | 9/2003 | Aasheim et al. | ........ 365/185.29 |
| 6,901,499 | B2 | * | 5/2005 | Aasheim et al. | ............. 711/205 |
| 6,948,033 | B2 | * | 9/2005 | Ninose et al. | ................ 711/122 |
| 7,080,232 | B2 | * | 7/2006 | Aasheim et al. | ............. 711/205 |
| 7,277,978 | B2 | * | 10/2007 | Khatami et al. | ............. 711/103 |
| 7,321,951 | B2 | * | 1/2008 | Wong et al. | .................. 711/103 |
| 7,350,044 | B2 | * | 3/2008 | Keays | ........................ 711/165 |
| 7,457,912 | B2 | * | 11/2008 | Khatami et al. | ............. 711/103 |
| 2003/0163631 | A1 | * | 8/2003 | Aasheim et al. | ............. 711/103 |
| 2003/0163632 | A1 | * | 8/2003 | Aasheim et al. | ............. 711/103 |
| 2004/0078542 | A1 | | 4/2004 | Fuller et al. | .................. 711/172 |
| 2005/0010924 | A1 | | 1/2005 | Hipp et al. | ................... 718/104 |
| 2005/0138271 | A1 | * | 6/2005 | Bernstein et al. | ............ 711/103 |
| 2005/0204091 | A1 | * | 9/2005 | Kilbuck et al. | .............. 711/103 |
| 2007/0061505 | A1 | * | 3/2007 | Deng et al. | .................. 711/103 |

OTHER PUBLICATIONS

"Microsoft Computer Dictionary", 2002, Microsoft Press, Fifth Edition, p. 213.*
"Microsoft Computer Dictionary", 2002, Microsoft Press, Fifth Edition, p. 499.*

* cited by examiner

*Primary Examiner*—Qing-Yuan Wu
(74) *Attorney, Agent, or Firm*—Woodcock Washburn LLP

(57) ABSTRACT

A flash driver can be used by file systems and other applications to determine more detailed attributes and properties, such as region geometry, that describe the underlying flash component. This allows a file system, for example, to be made aware of each flash region and its properties. The file system may then be optimized to more efficiently utilize the flash component. These optimizations may lead to increased component longevity and better read/write performance.

20 Claims, 4 Drawing Sheets

DESCRIBING AND QUERYING DISCRETE REGIONS OF FLASH STORAGE

BACKGROUND

Flash storage components, such as NAND and NOR flash storage components, are often composed of, or can optionally be configured with, discrete physical regions each having different characteristics. The characteristics include different block, page, and sector sizes, unique read/write/erase performance attributes, and the ability to read-only, read/write, or write-once, for example.

Conventional software file systems view flash components as single, heterogeneous sets of sectors or clusters without consideration of the different regions' characteristics. There is no standard mechanism for exposing flash region information pertaining to each region and its properties to a file system. This leads to an inefficient utilization and performance of the flash components.

SUMMARY

A flash driver can be used by file systems and other applications to determine more detailed attributes and properties, such as region geometry, that describe the underlying flash component. This allows a file system, for example, to be made aware of each flash region and its properties. The file system may then be optimized to more efficiently utilize the flash component. These optimizations may lead to increased component longevity and better read/write performance.

An internal API (application program interface) in the flash media driver provides low-level flash properties to a flash abstraction layer. A flash driver interface, such as an I/O (input/output) control code, is exposed by the flash driver and provides flash and driver properties. This I/O control code can be used by the file system and other applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A flash storage architecture, such as a flash abstraction layer multiple objects architecture, allows for the physical partitioning of a single flash component into regions which can each be treated independently. Each flash region is desirably isolated from one another and may be managed by a flash abstraction layer object. The flash abstraction layer object abstracts the interface to the flash component and provides a driver interface used for upper layers in the stack, such as a partition driver and a file system driver. Moreover, the flash abstraction layer multiple objects architecture supports variable block size flash components. Variable block size components contain regions of flash that have a different block size from other regions.

A flash storage component may comprise discrete physical regions each having different characteristics. The characteristics include different block, page, and sector sizes, unique read/write/erase performance attributes, and the ability to read-only, read/write, or write-once, for example. Regions may have unique performance properties as well as different block sizes. An interface is provided so that a file system may use the properties, as well as future properties, of flash storage components.

Figure 1:
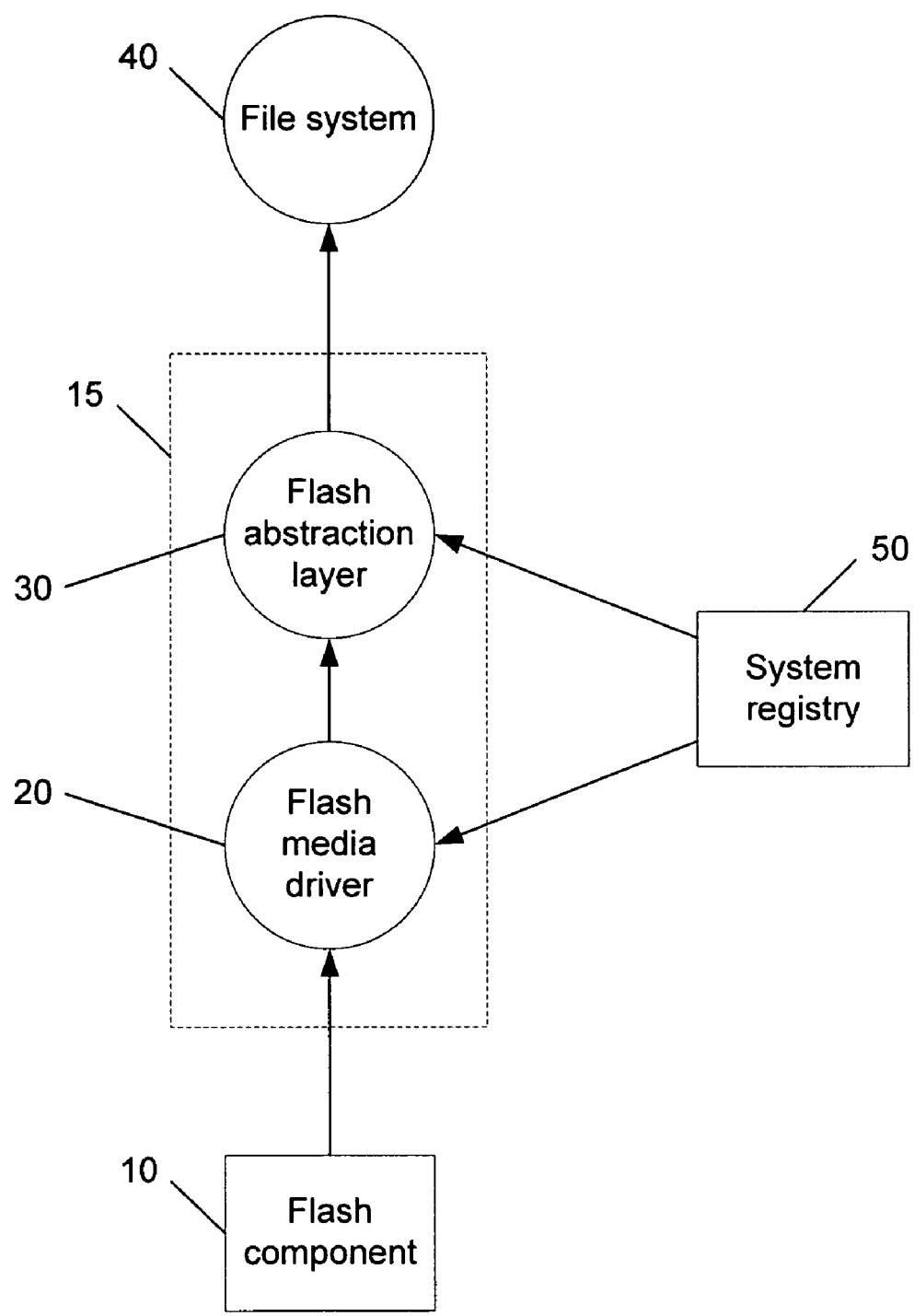
FIG. 1 is a block diagram of an example flash querying system.

FIG. 1 is a block diagram of an example flash querying system. A flash driver 15 can be used by file systems and other applications to determine more detailed attributes and properties, such as region geometry, that describe the underlying flash component 10. This allows a file system 40, for example, to be made aware of each flash region and its properties. The file system may then be optimized to more efficiently utilize the flash component 10. These optimizations may lead to increased component longevity and better read/write performance. As used herein, a flash driver refers to a component, such as a software component, which manages the flash and exposes the flash to the upper layers (e.g., partition drivers, file systems, etc.). A flash driver interface may be an API that is exposed by the flash driver to the upper layers.

With respect to FIG. 1, a flash driver 15, comprising a flash media driver 20 and flash abstraction layer 30, may receive property information, as well as other information, from hardware, such as a flash media or storage component 10, and/or a system registry 50. The system registry 50 provides low-level properties retrieved during driver configuration to the flash media driver 20, and high-level properties retrieved from the driver configuration to the flash abstraction layer 30. The flash driver 15 may provide the property information to a file system 40, for example. Low-level properties include physical characteristics of the flash, such as read speed, write speed, block size, etc., for example. High-level properties may be software imposed or enforced, such as read-only, read/write, reserved regions, atomic write, etc., for example.

The flash component 10, may comprise a NAND or NOR component, for example, and desirably provides low-level properties to the flash media driver 20. The flash media driver 20 may be device specific and is desirably involved in the direct physical access to the flash component 10.

Within the flash driver 15, the low-level properties for the flash component 10 are provided to the flash abstraction layer 30. The flash abstraction layer 30 is a layer above the flash media driver 20 that handles wear-leveling, write sector transactions, logical to physical sector mapping and translation, and is independent of media type.

An example flash abstraction layer may comprise a sector manager, a logical to physical sector mapper, and a compactor. A sector manager may be responsible for managing the list of free sectors on the media. When prompted, the sector manager will desirably return the next free sector on the media (if available). A logical to physical sector mapper may be responsible for returning the logical to physical sector mapping. The file system uses logical sectors that are then mapped to arbitrary physical sectors on the media. As a result, the flash abstraction layer desirably translates the logical sector addresses from the file system into the corresponding physical sector addresses on the media. A compactor may be responsible for recycling DIRTY sectors into FREE sectors. The compactor desirably analyzes an entire FLASH block to determine which sectors are DIRTY and can be recycled. Any sectors in a block that are not DIRTY are re-mapped to another portion of the media.

An example flash media driver is a pluggable component responsible for performing the actual I/O to the flash device. Desirably, flash media drivers contain the device-specific code used for read/write/erase of the flash memory device.

More particularly, the property and other information, for example, from the flash component 10 and/or the system registry 50 are provided to the flash abstraction layer 30. The flash abstraction layer 30 provides the information (the properties and the ranges of hardware) to the file system 40. Thus, the properties of the flash component 10 and the flash driver 15 are provided from the flash driver 15 to the file system 40.

Two interfaces are provided: an interface for the flash abstraction layer 30 to query the flash media driver 20, and an interface to provide information to the file system 40 from the flash abstraction layer 30. The interfaces may be implemented using structures queried using I/O control codes, for example. The flash media driver 20 provides information pertaining to the physical characteristics of the flash component 10 to the flash abstraction layer 30, which in turn provides it to the file system 40 where it can be used.

As an example, the flash driver 15 may comprise an internal API (application program interface) in the flash media driver 20 that provides low-level flash properties to the flash abstraction layer 30. The flash driver interface may comprise an I/O (input/output) control code that is exposed and provides flash and driver properties. This I/O control code can be used by the file system 40 and other applications, for example.

The flash media driver 20 is desirably hardware specific and can exploit the existing properties of the flash components 10. Alternately, a user may create a flash media driver 20 by adding support for the flash media driver functions to the user's driver, for example. The flash abstraction layer 30 uses the functions and properties of the flash media driver 20.

Figure 2:
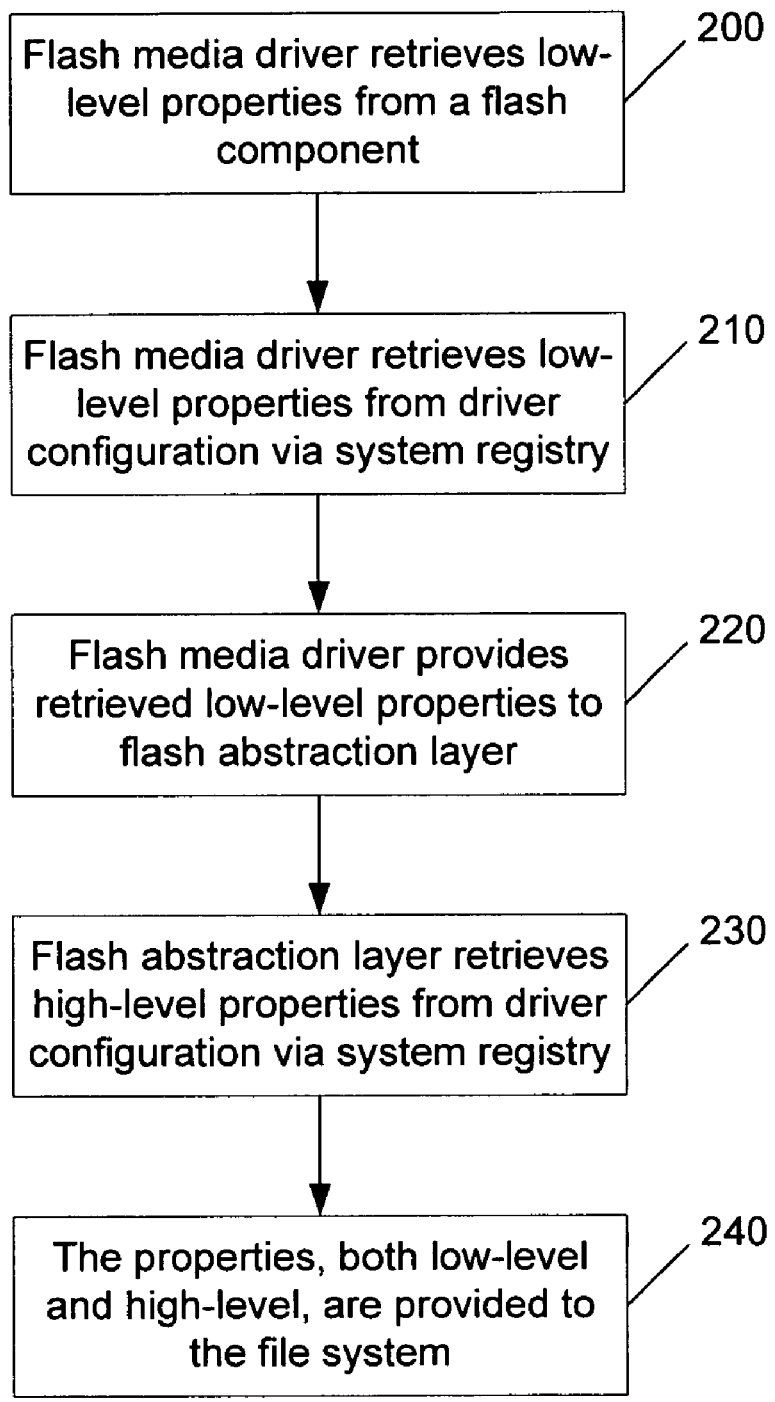
FIG. 2 is a flow diagram of an example method of querying flash.

FIG. 2 is a flow diagram of an example method of querying flash. At step 200, a flash media driver retrieves low-level properties from a flash component. At step 210, the flash media driver may retrieve low-level properties from the driver configuration via the system registry. The flash media driver provides the retrieved low-level properties to the flash abstraction layer at step 220. The flash abstraction layer retrieves high-level properties from the driver configuration via the system registry at step 230. The properties, both low-level and high-level, are provided to the file system at step 240.

The flash media driver API provides general low-level details about the flash component. This API may describe the geometry of the flash component as well as any reserved portions of the component. For example, there are four information levels for the API that can be provided by the flash media driver: basic flash information, flash region standard information, flash region performance information, and flash reserve standard information. This information is obtained from the flash hardware itself. It is contemplated that the API may be extended to support additional information levels as requirements and preferences change.

Basic flash information desirably includes general information about the flash component, such as flash type: NAND or NOR; manufacturer ID; serial number; number of regions; and number of reserved regions, for example.

Flash region standard information desirably includes an array of structures, one per flash region, each describing basic properties of the region, such as: region properties (read-only, write-once, sequential programming required (MLC flash)); page program limit; physical and logical geometry; data bytes per sector; and spare bytes per sector, for example.

Flash region performance information desirably includes an array of structures, one per flash region, each describing performance characteristics of the region, such as read throughput; write throughput; erase time; read setup time; and write setup time, for example.

Flash reserve standard information desirably includes an array of structures, one per reserved flash region, each describing the reserved region, such as the name of the reserved region; location and size of the reserved region; and reserved region properties (read-only, write-once), for example. The reserved region is desirably hidden from the file system. This information may or may not come from the flash hardware.

The information provided by the flash media driver may be gathered from multiple locations. For example, some information may be hard-coded in the flash media driver code, some may be read from the system registry, and some may be retrieved directly from the flash component via a common flash interface (CFI) or other means. Flash components without discrete regions may report one region spanning the entire flash components.

The flash abstraction layer will desirably combine its own information with the information provided by the flash media driver to form a rich set of flash properties exposed via an interface, such as via an I/O control code. There are four information levels for this API that can be provided by the flash media driver: standard information, region standard information, region performance information, and reserve standard information. The API can be extended to support additional information levels as requirements and preferences change. This information is similar to the information at the flash media driver. This is the information that third party flash software providers would expose.

Standard information desirably includes general information about the entire storage device, such as manufacturer ID; serial number; number of regions; and number of reserved regions, for example.

Region standard information desirably includes properties and features of a distinct region within a storage device. For storage devices without multiple distinct regions, a single structure may be used to describe the entire device. Information here includes properties of this region (read-only, read/write, write-once, XIP, atomic write); features supported by this region (sector delete, secure wipe, cache flush); sector and block size; total sector count; and spare block count, for example.

Region performance information desirably includes performance capabilities of a distinct region within a storage device. For storage devices without multiple distinct regions, a single structure may be used to describe the entire device. Information may include preferred read transfer size (number of sectors); preferred write transfer size (number of sectors); read transfer rate; write transfer rate; read setup time; and write setup time, for example.

Reserve standard information desirably includes information about a reserved region of the storage device that is inaccessible via standard read and write operations, such as name of the reserved region; location and size of the reserved region; and reserved region properties (read-only, write-once), for example.

Support for the flash driver is not limited to flash devices, and may be supported by other media (hard disks, removable flash cards, etc) where there is need to provided a set of rich information describing device properties.

Regarding file system utilization, with the rich information provided by the flash driver, it is possible for a file system to better utilize the flash component for higher performance and longer component longevity. For example, a flash component may be configured with two block sizes: the first portion of the component is configured less densely as SLC flash (sectors 0 through N), and the remainder of the flash is configured as denser MLC flash (sectors N+1 through M). MLC and SLC are two categories of currently available flash.

Figure 3:
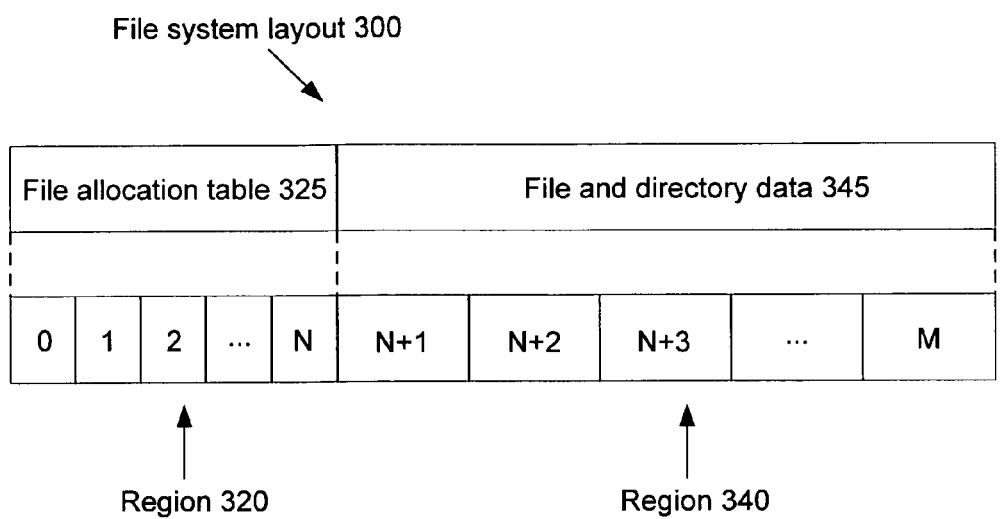
FIG. 3 is a diagram of an example file system layout.

An example file system layout is shown in FIG. 3. The file system layout 300 comprises two regions: a region 320 containing a file allocation table 325 and a region 340 containing file and directory data 345. The region 320 may have a density of 32 sectors per block, for example, and have a high read/write performance. The region 340 may have a density of 64 sectors per block, for example, and have a medium read/write performance.

Blocks 0 to N in the file allocation table 325 are smaller than the blocks N+1 to M in the file and directory data 345. So 0 to N have less data than N+1 to M. It is faster to erase (for example) a smaller block than a larger block, so it is desirable to put data that the file system reads and writes frequently into the smaller blocks. This makes the system faster.

Such an example flash configuration results in smaller block sizes and higher performance for the SLC portion of the flash, making this region desirable for frequently accessed data such as metadata. The file system may choose to store its frequently-accessed file allocation table 325 in the SLC portion of flash, putting file and directory data 345 in the remaining MLC portion of flash. This example layout leverages the higher performance of SLC for the most frequently accessed sectors and the density of MLC flash to store more data. Other optimizations, such as storing the root directory contents in the SLC portion may also improve performance.

Exemplary Computing Arrangement

Figure 4:
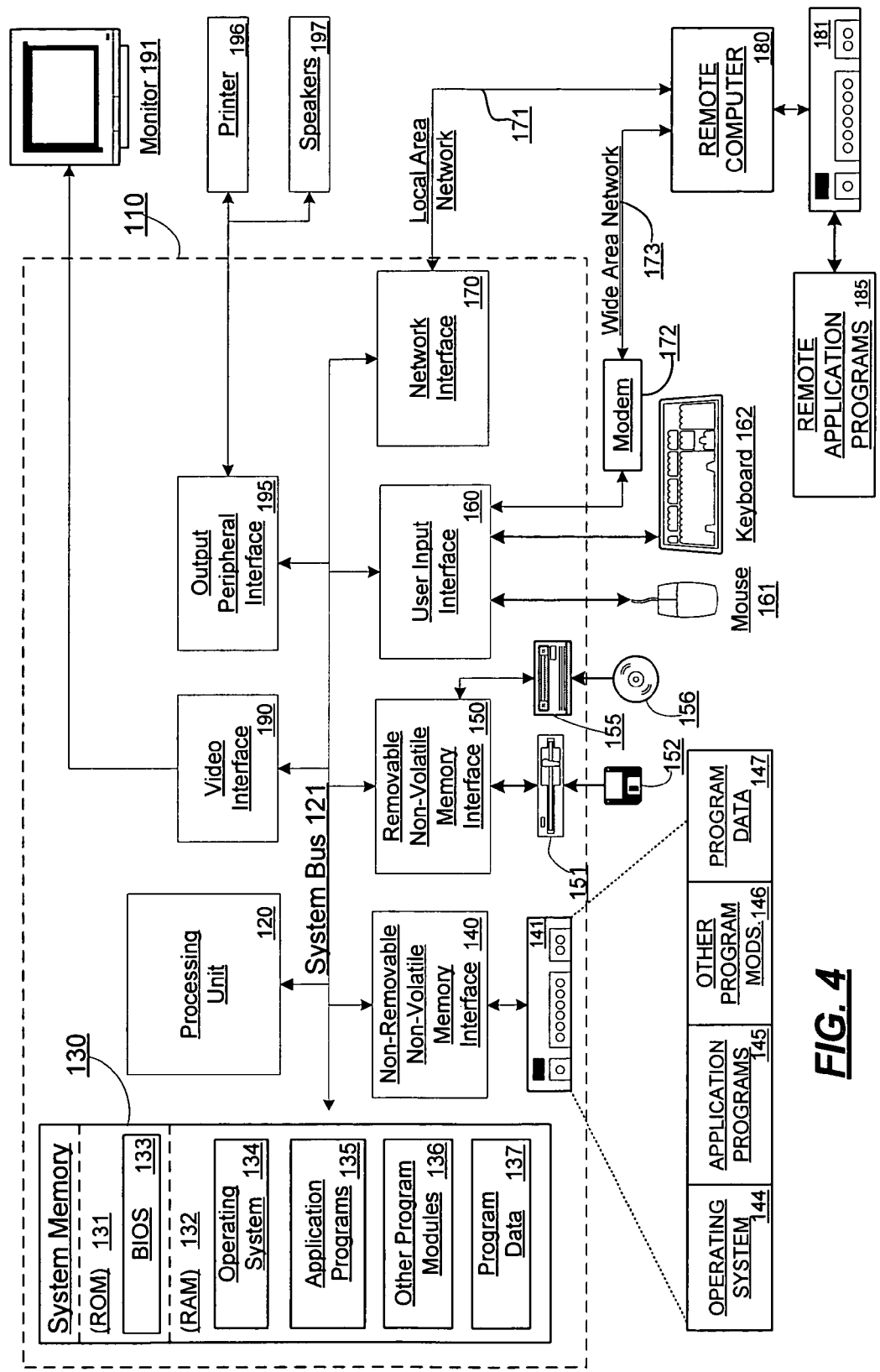
FIG. 4 is a block diagram of an example computing environment in which example embodiments and aspects may be implemented.

FIG. 4 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A flash component querying system comprising a processor, the system comprising:
    a flash driver, executed by the processor, that maintains data regarding a flash component; and
    a file system that receives the data from the flash driver, said data comprising characteristics of a plurality of discrete regions of the flash component, the characteristics including performance information for one or more discrete regions of the plurality of discrete regions, the performance information indicating a performance level of the one or more discrete regions, and the file system using the data to optimize file system layout and use of the flash component at least in part by utilizing one or more discrete regions associated with a high performance level for frequently accessed information.

2. The system of claim 1, wherein the data further comprises property information pertaining to the flash component.

3. The system of claim 1, wherein the flash driver is adapted to receive the data regarding the flash component from the flash component.

4. The system of claim 1, wherein the flash driver comprises:
    a flash media driver; and
    a flash abstraction layer in communication with the flash media driver.

5. The system of claim 4, further comprising a system registry that provides low-level properties to the flash media driver, and high-level properties to the flash abstraction layer.

6. The system of claim 5, wherein the flash media driver is adapted to provide the low-level properties to the flash abstraction layer.

7. The system of claim 4, wherein the flash media driver is adapted to receive the data regarding the flash component from the flash component.

8. The system of claim 1, wherein the characteristics data further comprises information regarding at least one of different block, page, or sector sizes and different performance attributes in each of the plurality of discrete regions of the flash component.

9. A method of querying a flash component, comprising:
    receiving data pertaining to properties of a flash component at a flash driver, said data further comprising characteristics of a plurality of discrete regions of the flash component, the characteristics including performance information for one or more discrete regions of the plurality of discrete regions, the performance information indicating a performance level of the one or more discrete regions;
    providing the received data to a file system; and
    utilizing the data by the file system to optimize file system layout and use of the flash component at least in part by utilizing one or more discrete regions associated with a high performance level for frequently accessed information.

10. The method of claim 9, wherein receiving data pertaining to the flash component comprises receiving data from the flash component.

11. The method of claim 9, wherein receiving data pertaining to the flash component comprises receiving data from a system registry.

12. The method of claim 9, wherein the flash driver comprises a flash media driver, and receiving data pertaining to the flash component comprises retrieving data using the flash media driver.

13. The method of claim 12, wherein the flash driver comprises a flash abstraction layer in communication with the flash media driver, further comprising providing the retrieved data to the flash abstraction layer.

14. The method of claim 13, further comprising providing additional data to the flash abstraction layer from a driver configuration via a system registry.

15. The method of claim 9, wherein the characteristics data further comprises information regarding at least one of different block, page, or sector sizes and different performance attributes in each of the plurality of discrete regions of the flash component.

16. A computer-readable storage medium comprising computer-executable instructions that are executable by a computer to implement a flash driver, the computer-executable instructions comprising:

computer-executable instructions for implementing a flash media driver that maintains data pertaining to a flash component; and computer-executable instructions for implementing a flash abstraction layer that receives the data from the flash media driver and provides the data to a file system, said data comprising characteristics of a plurality of discrete regions of the flash component, the characteristics including performance information for one or more discrete regions of the plurality of discrete regions, the performance information indicating a performance level of the one or more discrete regions, and the data being used by the file system to optimize file system layout and use of the flash component at least in part by utilizing one or more discrete regions associated with a high performance level for frequently accessed information.

17. The computer-readable storage medium of claim 16, wherein the characteristics data further comprises information regarding at least one of different block, page, or sector sizes and different performance attributes in each of the plurality of discrete regions of the flash component.

18. The computer-readable storage medium of claim 16, wherein the flash media driver is adapted to receive the data from the flash component.

19. The computer-readable storage medium of claim 16, wherein the flash driver is adapted to receive low-level properties at the flash media driver, and high-level properties at the flash abstraction layer, from a system registry.

20. The computer-readable storage medium of claim 19, wherein the flash media driver is adapted to provide the low-level properties to the flash abstraction layer.

* * * * *